United States Patent
Yamagata et al.

(10) Patent No.: US 7,064,871 B2
(45) Date of Patent: Jun. 20, 2006

(54) IMAGE READING APPARATUS WHICH CONTROLS A CORRECTION OPERATION OF AN IMAGE SIGNAL OF AN ORIGINAL IMAGE READ THROUGH A TRANSPARENT MEMBER IN ACCORDANCE WITH INDIVIDUAL DATA REPRESENTING TRANSMITTANCY OF THE TRANSPARENT MEMBER

(75) Inventors: Shigeo Yamagata, Kanagawa (JP); Kenji Hiromatsu, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 869 days.

(21) Appl. No.: 10/021,246

(22) Filed: Dec. 19, 2001

(65) Prior Publication Data
US 2002/0114026 A1  Aug. 22, 2002

(30) Foreign Application Priority Data
Dec. 25, 2000  (JP)  ............................. 2000-393734

(51) Int. Cl.
*H04N 1/04* (2006.01)

(52) U.S. Cl. ...................... 358/474; 358/487; 358/496; 358/516; 359/197

(58) Field of Classification Search ................ 358/516, 358/515, 506, 461, 474, 496, 484; 359/197
See application file for complete search history.

(56) References Cited

U.S. PATENT DOCUMENTS
6,614,561 B1 * 9/2003 Tseng ......................... 358/474

FOREIGN PATENT DOCUMENTS
JP          7-273954          10/1995

* cited by examiner

*Primary Examiner*—Thomas D. Lee
*Assistant Examiner*—Heather D Gibbs
(74) *Attorney, Agent, or Firm*—Fitzpatrick, Cella, Harper & Scinto

(57) ABSTRACT

An image reading apparatus includes a line CCD which reads an original image placed on a glass original table which is illuminated by a light source, and an analog signal processor circuit which adjusts the signal level of the resulting signals, and a unit which sets numeric data which depends on the transmittancy of the glass original table. The analog signal processor circuit controls the amount of adjusting the signal level based on the set numeric data.

7 Claims, 13 Drawing Sheets

READ SIGNAL LEVEL (INTENSITY)

INPUT SIGNAL

IMAGE READING APPARATUS WHICH CONTROLS A CORRECTION OPERATION OF AN IMAGE SIGNAL OF AN ORIGINAL IMAGE READ THROUGH A TRANSPARENT MEMBER IN ACCORDANCE WITH INDIVIDUAL DATA REPRESENTING TRANSMITTANCY OF THE TRANSPARENT MEMBER

BACKGROUND OF THE INVENTION

1. Field of the Invention

The present invention relates to an image reading apparatus using an image sensor such as a CCD (charge coupled device), and more particularly to an image reading apparatus which includes an original table having noticeable variations in transmittancy.

2. Description of the Related Art

Hitherto, in an attempt to compensate for variations in the outputs of image sensors such as CCDs, an image reading apparatus such as a copier or a facsimile machine performs shading correction in which the image sensors are used to read a reference white board having a constant density, and the lamp voltage, circuit gain, and the like are controlled so that the read data reaches a predetermined value.

In an image reading apparatus having a mechanism for automatically feeding an original onto a glass original table, the glass original table may be sometimes implemented as an EC-coated glass plate, i.e., one which is coated with an electrically conductive coating agent in order to prevent or reduce static electricity which is produced by friction between the glass original table and the original. In this case, a reference white board for shading correction is also read by an image sensor through a normal glass plate that is not coated with such an electrically conductive coating agent.

Since an EC-coated glass plate has a slightly lower transmittancy than a normal glass plate, the R, G, and B signal levels are each lowered, by approximately 4 to 6%, as compared to when the same original is read through a normal glass plate. Therefore, one problem is that the signal levels cannot be precisely corrected for even if an original image signal which is read through the EC-coated glass plate is subjected to shading correction based on the reference white board data read through the normal glass plate.

In order to overcome this problem, as disclosed in Japanese Patent Laid-Open No. 7-273954, a contemplated method is to perform shading correction on an original image signal taking into account a difference in transmittancy between a normal glass plate which carries a reference white board and a glass original table which is coated with an electrically conductive coating agent.

In this approach, however, the transmittancies of the normal glass plate and EC-coated glass plate are uniquely defined, and variations in transmittancy from one EC-coated glass plate to another are not considered at all.

In production, the transmittancy of EC-coated glass plates varies over a range of about ±2%, leading to the problem that image reading level is different from the inherent signal level. With an EC-coated glass plate having a higher transmittancy, obscure detail in a highlighted area is revealed; with one having a lower transmittancy, conversely, the image becomes darker, with a foggy background.

In a typical image reading apparatus, light emitted from a light source passes through a glass original table is reflected by an original, again passes through the glass original table, and is then focused on a CCD through a mirror and a lens. Since light passes through the glass original table twice, a difference in transmittancy due to variations in transmittancy of EC-coated glass plates may doubly affect the reading level.

Furthermore, a problem involved with an apparatus which uses a scanner to read printer output patches and which corrects for a printer gradation characteristic is that variations in transmittancy of EC-coated glass plates cause the read signals of gradation patches to vary in the printer outputs, thereby preventing a precise gradation correction. This problem is noticeable, in particular, with an EC-coated glass plate having a higher transmittancy, such that reading of gradation patches in a highlighted area is saturated, causing a pseudo-outline.

SUMMARY OF THE INVENTION

Accordingly, it is an object of the present invention to provide an image reading apparatus capable of precisely reading an image without being affected by variations in transmittancy of an original table.

To this end, an image reading apparatus according to one aspect of the present invention includes an original table which is made of a transparent member, a reading unit which reads an original image through the original table and outputs an image signal, a correction unit which corrects the signal level of the image signal, a setting unit which sets numeric data which depends on the transmittancy of the transparent member, and a control unit which controls a correction amount of the correction unit in accordance with the numeric data set by the setting unit.

Accordingly, an image can be precisely read without being affected by variations in transmittancy of an original table.

Further objects, features, and advantages of the present invention will become apparent from the following description of the preferred embodiments.

DESCRIPTION OF THE PREFERRED EMBODIMENTS

The present invention is described in conjunction with the following description of its preferred embodiments with reference to the drawings.

First Embodiment

Figure 1:
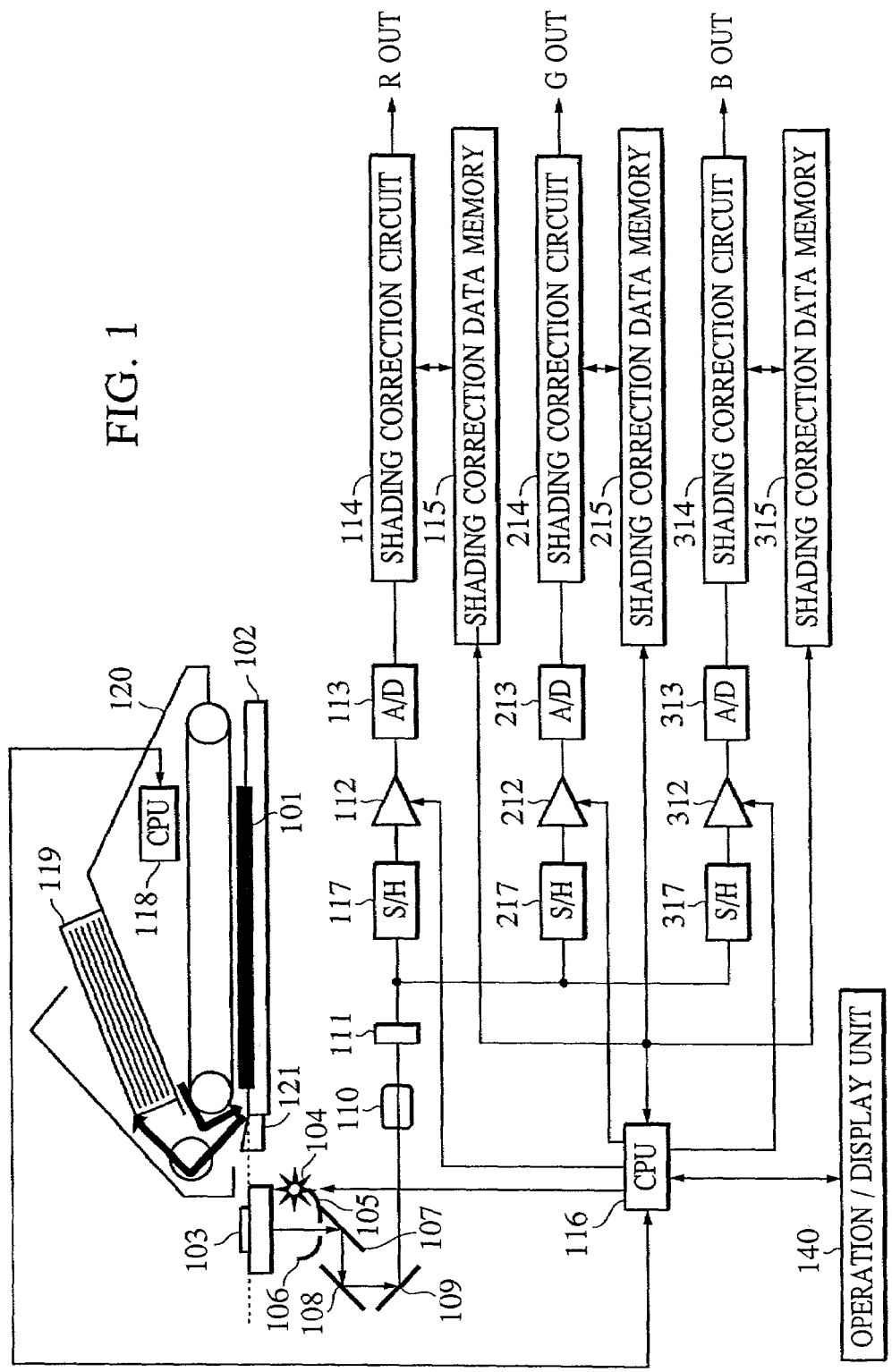
FIG. 1 is a block diagram of an image reading apparatus according to a first embodiment of the present invention.

FIG. 1 is a block diagram of an image reading apparatus according to a first embodiment of the present invention.

A CPU 116 is a controller which controls the overall apparatus. When an original 101 and a white reference board 103 which are placed on a glass original table 102 are illuminated by a light source (lamp) 104, light reflected thereby is directed to a lens 110 through reflection mirrors 107 to 109, and is then focused on a line CCD 111. The reflection mirrors 107 to 109 are reciprocally moved by a driving mechanism (not shown). Reflecting umbrellas 105 and 106 are in the vicinity of the light source 104 for condensing light from the light source 104 into the irradiation position.

The line CCD 111 includes color separation filters for red (R), green (G), and blue (B) which photoelectrically convert the incident light to output R, G, and B analog signals. The R, G, and B analog signals output from the line CCD 111 are separate in colors in sample-and-hold circuits 117, 217, and 317, and are amplified to a predetermined level by analog signal processor circuits (voltage control amplifiers) 112, 212, and 312. The amplified R, G, and B analog signals are converted into digital signals by A/D converters 113, 213, and 313, and nonuniformity (shading) resulting from a nonuniform amount of light from the light source or variations in sensitivity of the line CCD 111 is corrected for by shading correction circuits 114, 214, and 314. Shading correction data memories 115, 215, and 315 store shading parameters of the shading correction circuits 114, 214, and 314.

The CPU 116 controls circuit gains of the signal processor circuits 112, 212, and 312, and the lamp voltage of the light source 104, and sets the shading correction parameters in the shading correction data memories 115, 215, and 315. The CPU 116 further reads data stored in the shading correction data memories 115, 215, and 315 to perform a calculation on the read data. The CPU 116 is also connected to an operation/display unit 140.

The image reading apparatus according to the first embodiment includes an automatic document feeder (DF) 120 having a delivering/discharging mechanism which automatically delivers an original 119 to be read to the glass original table 102 and discharges it from the glass original table 102. The operation of the DF 120 is controlled by a CPU 118 contained therein. A jump feed 121 is disposed between the reference white board 103 with a barcode and the glass original table 102. The jump feed 121 lifts the original 101 upward when the original 101 is discharged from the glass original table 102 so that the original 101 can be automatically discharged in a smooth manner by the DF 120.

Figure 2:
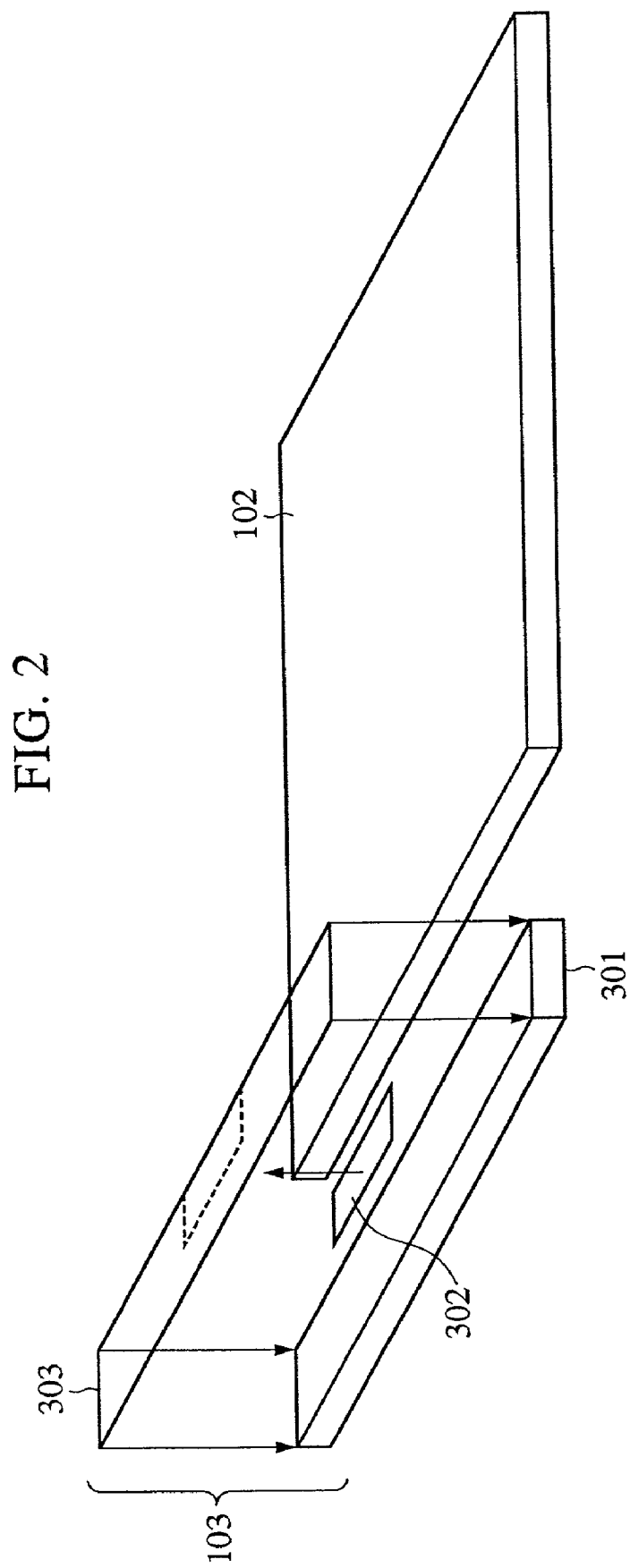
FIG. 2 is a perspective view of the construction of a reference white board with a barcode and a glass original table.

FIG. 2 shows the structure of the white reference board 103 and the glass original table 102 which is aligned therewith. As shown in FIG. 2, a barcode label 302 is affixed to a white-painted aluminum plate 303, and the aluminum plate 303 is adhered to a glass plate 301, forming the white reference board 103.

Figure 3:
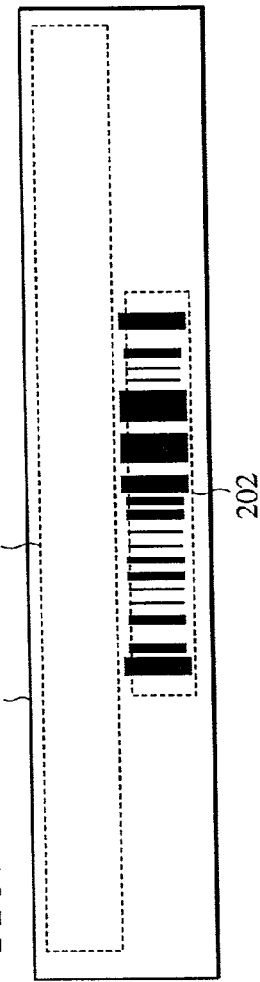
FIG. 3 is an external view of the reference white board with the barcode.

FIG. 3 shows the white reference board 103 as viewed from the underside, and a portion encircled by a dotted line 201 indicates a reference white portion of the white board (white-painted aluminum plate) 303 having a predetermined density (or calorimetric value). The barcode label 302 is affixed in a portion encircled by a dotted line 202 (hereinafter referred to the "barcode portion").

The barcode label 302 has a value encoded and recorded thereon, and this value is obtained by converting chromaticity coordinate XYZ values, which are obtained by measuring the reference white portion 201 using colorimetry, into RGB values using, for example, a 3×3 matrix equation. Any encoding technique may be employed. For example, a technique disclosed in Japanese Patent Laid-Open No. 7-273954, as noted above, may be used.

Figure 5:
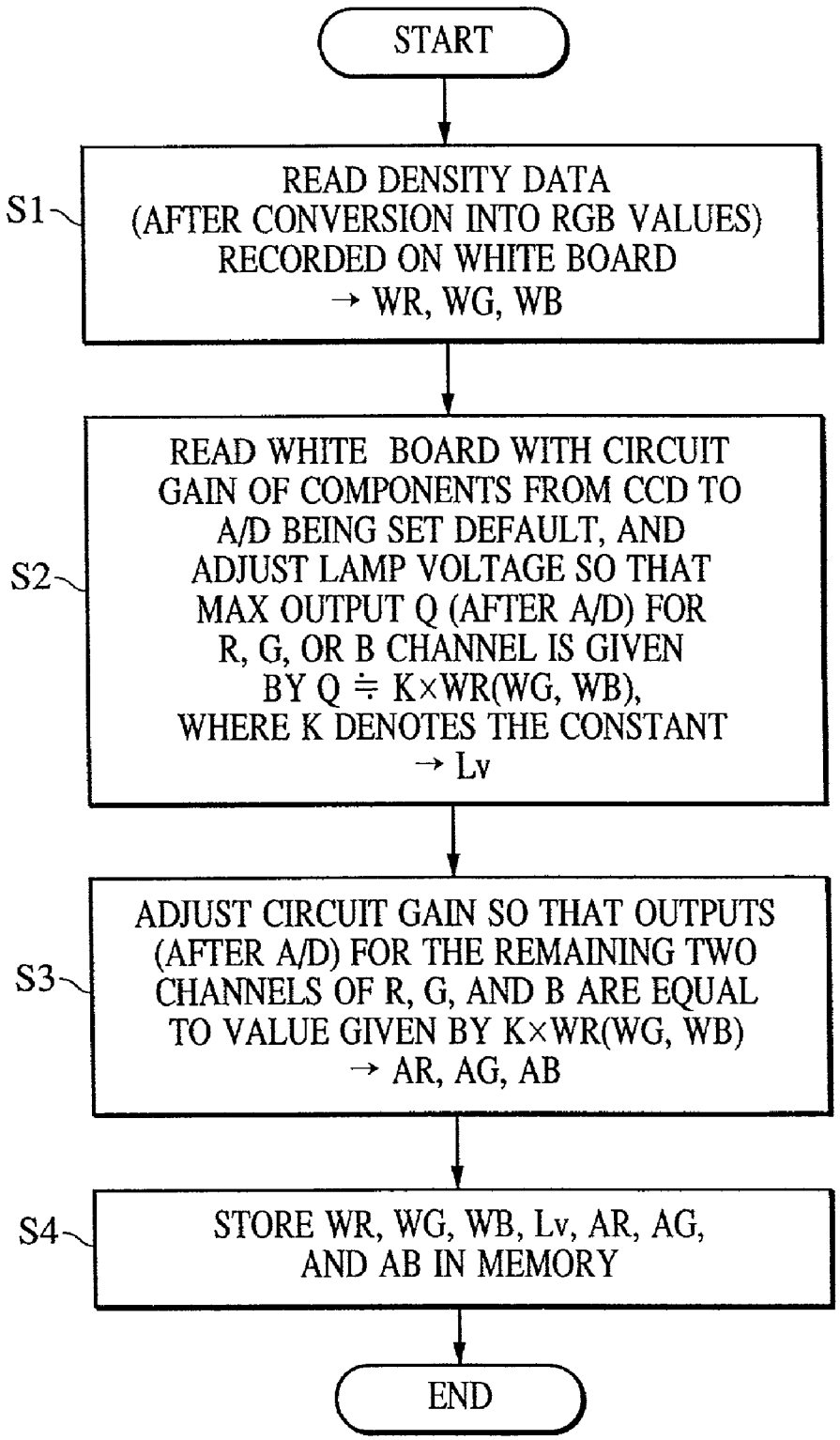
FIG. 5 is a flowchart of a control procedure of the lamp voltage and circuit gain.

FIG. 5 is a flowchart of a control procedure for the lamp voltage and circuit gains which is performed by the CPU 116.

Step S1: Read Barcode

The lamp voltage and circuit gains are set to initial values or the previously controlled values, before the barcode portion 202 on the white reference board 103 is read by the line CCD 111. The resulting digital data after analog-to-digital conversion is tentatively stored in the shading correction data memory 115.

The CPU 116 reads the content of the shading correction data memory 115 to decode the content of the barcode, and acquires white board data WR, WG, and WB recorded on the barcode.

Step S2: Control Lamp Voltage

Figure 6A:
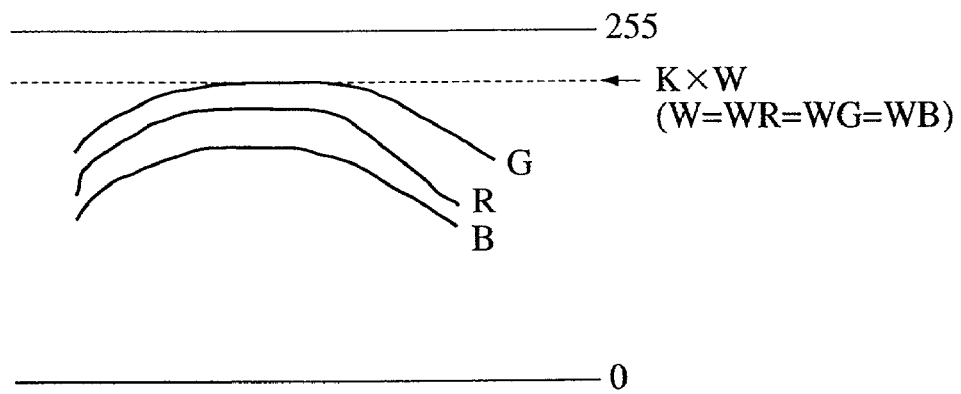
FIGS. 6A to 6C are charts which illustrate the control procedure.

The lamp voltage is controlled as shown in FIG. 6A. Circuit gains of the components from the line CCD 111 to the A/D converter 113 are set to initial values, before the reference white portion 201 on the white reference board 103 is read using the line CCD 111. The R, G, and B digital data after analog-to-digital conversion are tentatively stored in the shading correction data memories 115, 215, and 315. The CPU 116 reads the content of the shading correction data memories 115, 215, and 315 to calculate the maximum output values QR, QG, and QB for the respective channels.

The control procedure is repeated so that the lamp voltage increases if at least one of QR, QG, and QB is less than the value given by K·WRGB ("WRGB" indicates any of the white board data WR, WG and WB, respectively), and the lamp voltage decreases if all of QR, QG, and QB are greater than the value given by K·WRGB. The lamp voltage is controlled so that the maximum value of the highest output channel in the maximum values QR, QG, and QB (in FIG. 6A, the maximum value QG for the G channel that is the highest output channel) is substantially equal to the value given by K·WRGB, where K is a constant of 1 or less (FIG. 6A shows an example where WR=WG=WB). The controlled lamp voltage is indicated by Lv.

The shading correction data memories 115, 215, and 315 are each in the form of a finite number of bits, and the correction range of the shading correction circuits 114, 214, and 314 is limited to, for example, one to two times. Therefore, if the correction range is limited to one to two times in the hardware configuration, K is a constant of 1 or less (for example, 0.9), thereby preventing occurrence of a region where the shading correction is not precisely performed.

Step S3: Control Circuit Gain

Figure 6B:
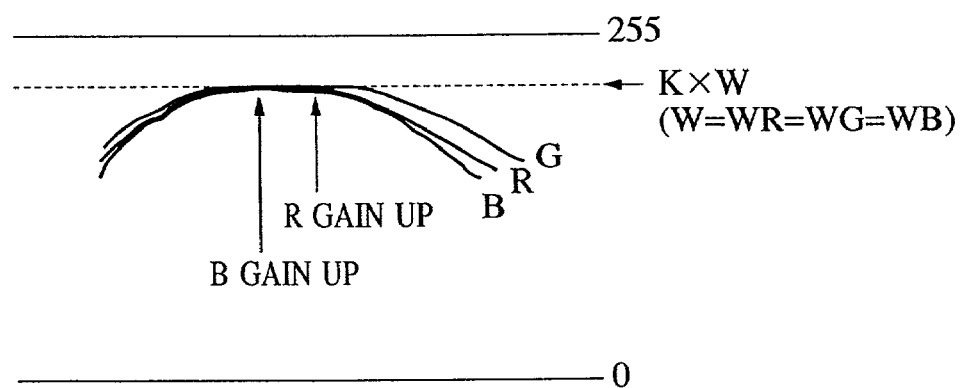
Figure 6C:
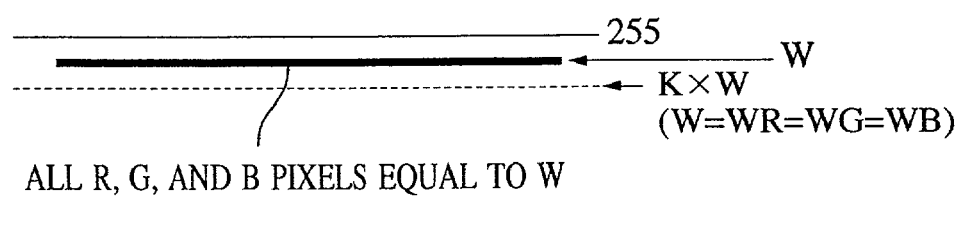

Then, the circuit gains are controlled so that the maximum values for the R and B channels are also substantially equal to the value given by K·WRGB, as shown in FIG. 6B. The gains for the R, G, and B channels are indicated by AR, AG, and AB, respectively. Accordingly, the lamp voltage and the circuit gains are controlled so that each of the maximum values QR, QG, and QB for the R, G, and B channels is substantially equal to the value given by K·WRGB.

Step S4: Store the Resultant Data

The resultant values WR, WG, WB, Lv, AR, AG, and AB are stored in a memory of the CPU 116 in order to capture image data later.

Then, shading correction data is prepared. First, the CCD 111 reads the white reference board 103 while the lamp voltage is set to Lv and the circuit gains are set to AR, AG, and AB. One line of data after analog-to-digital conversion is tentatively stored in the shading correction data memories 115, 215, and 315 for each color. The tentatively stored data are sequentially read by the CPU 116 for each color, and are converted into shading correction data so that each pixel of data is equal to WRGB. The resulting shading correction data are then rewritten to the shading correction data memories 115, 215, and 315.

In effect, when an original is read, shading correction is achieved by calculating, in the shading correction circuits 114, 214, and 314, the original image data after analog-to-digital conversion, and the shading-correction data of associated addresses which are stored in the shading correction data memories 115, 215, and 315. This calculation is expressed as follows:

$$DSj = \alpha j(ADj - DKj) \quad (1)$$

where DSj denotes the image data after shading correction, ADj denotes the image data before shading correction, DKj denotes dark image data, αj denotes the shading correction coefficient, and j denotes the pixel address. The shading correction coefficients αj are defined by the following equation (2):

$$\alpha Rj = \frac{WR}{WADRj - DKRj} \quad (2)$$

$$\alpha Gj = \frac{WG}{WADGj - DKGj}$$

$$\alpha Bj = \frac{WB}{WADBj - DKBj}$$

where WR, WG, and WB denote the white board data of R, G, and B, respectively, WADRj, WADGj, and WADBj denote the white board read values of R, G, and B, respectively, and DKRj, DKGj, and DKBj denote dark read values of R, G, and B, respectively.

As described above, the image reading apparatus according to the first embodiment includes the DF 120 having a delivering/discharging mechanism which automatically delivers the original 119 to the glass original table 102 and discharges it from the glass original table 102. The glass original table 102 is implemented as an EC-coated glass plate which is coated with an electrically conductive coating agent in order to eliminate or reduce static electricity produced by friction between the glass original table 102 and the original 119. On the other hand, the glass plate 301 of the white reference board 103 is implemented as a normal glass plate which is not coated with an electrically conductive coating agent, and so the reference white board 103 can be read without being affected by variations in transmittancy.

Since an EC-coated glass plate has a slightly lower transmittancy than a normal glass plate, the R, G, and B signal levels are each lowered by approximately 4 to 6% as compared to when an original is read through a normal glass plate. Furthermore, in production, the transmittancy of EC-coated glass plates varies over a range of about ±2%, causing variations in image reading level. In the first embodiment, advantageously, shading correction is performed taking into account variations in transmittancy from one EC-coated glass plate to another. Hence, the shading correction coefficients αRj, αGj, and αBj as used herein are expressed by the following equation (3) rather than equation (2):

$$\alpha Rj = \frac{WR}{WADRj - DKRj} \times \frac{1}{\beta ECR} \quad (3)$$

$$\alpha Gj = \frac{WG}{WADGj - DKGj} \times \frac{1}{\beta ECG}$$

$$\alpha Bj = \frac{WB}{WADBj - DKBj} \times \frac{1}{\beta ECB}$$

where βECR, βECG, and βECB denote the reduction rates of R, G, and B signal levels with an EC-coated glass plate, which is different from one EC-coated glass plate to another. The following equation (4) may also be used, where ECR, ECG, and ECB indicate the inverses of βECR, βECG, and βECB, respectively:

$$\alpha Rj = \frac{WR}{WADRj - DKRj} \times ECR \quad (4)$$

$$\alpha Gj = \frac{WG}{WADGj - DKGj} \times ECG$$

$$\alpha Bj = \frac{WB}{WADBj - DKBj} \times ECB$$

where ECR, ECG, and ECB denote the transmittancy correction coefficients which are used to correct for the decreased transmittancy when an EC-coated glass plate is used, for $1 \leq ECR$, $1 \leq ECG$, and $1 \leq ECB$. It is noted that ECRGB=1 if the glass original table 102 is implemented as a normal uncoated glass plate instead of an EC-coated glass plate.

Figure 4:
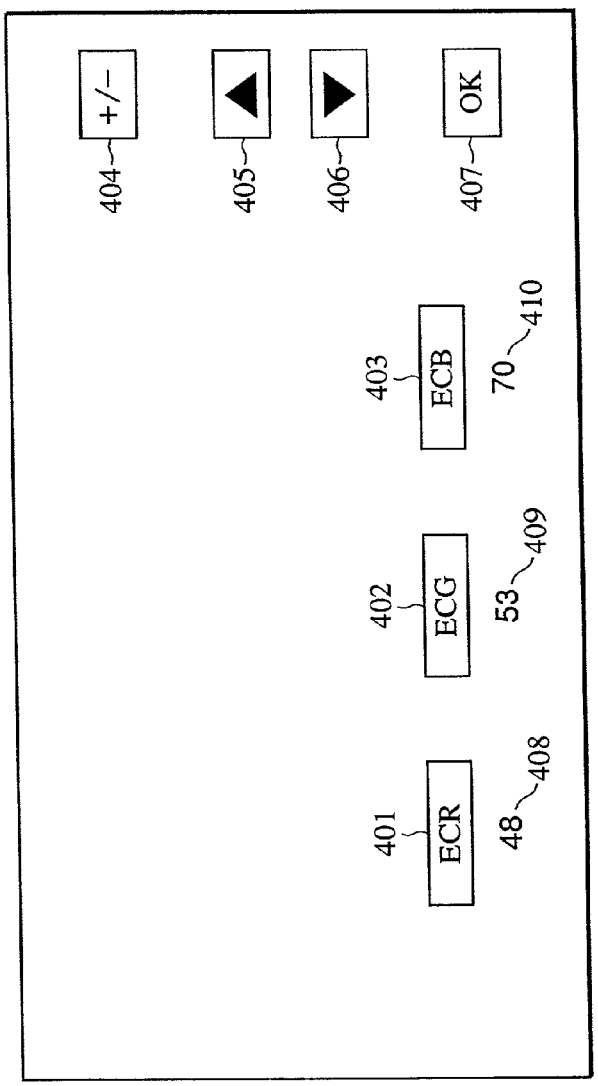
FIG. 4 is a view of a screen of an operation/display unit through which glass transmittancy correction values are entered.

The operation/display unit 140 provides an entry screen for transmittancy correction values, as shown in FIG. 4, and an operator enters, on this display screen, the ECR, ECG, and ECB values depending on the EC-coated glass plate used. When an "ECR" button 401 is turned on, an area 408 is available to enter the ECR value. Under these conditions, an up or down switch 405 or 406 is pressed to increase or decrease the numeric value, and a plus/minus button 404 is pressed to select plus or minus. An OK button 407 is pressed, allowing the entered numeric value to be stored in a back-up memory of the CPU 116, and the data entry ends.

An "ECG" button 402 and an "ECB" button 403 are turned on, and the ECG value and the ECB value are entered to areas 409 and 410 in the same way, respectively. In FIG. 4, values 48, 53, and 70 are entered as the ECR, ECG, and ECB values, by way of example. Instead of the up and down switches 405 and 406, a ten-key pad (not shown) may be used to enter numbers directly. When an original is read, shading correction is performed using the shading correction coefficients αj given by equation (4).

The ECR, ECG, and ECB values may be affixed to the respective glass plates by any information communication tool. For example, a label having pre-measured numeric values imprinted thereon may be affixed to an EC-coated glass plate, and an operator may refer to the imprinted label to enter the correction values on the entry screen shown in FIG. 4.

As described above, the image reading apparatus according to the first embodiment separately includes a white reference board and a glass original table. If the glass original table is implemented as an EC-coated glass plate having variations in transmittancy from product to product, the influence of the variations in transmittancy of the glass plates can be eliminated or reduced during shading correction. Therefore, precise image reading can be achieved in which the resulting image is prevented from being foggy or obscure. Although a glass plate is used for an original table in the first embodiment, that plate is not limited to glass; rather it may be made of any transparent member capable of passing light therethrough. For example, other resin members, such as plastic, may be used.

Second Embodiment

Figure 7:
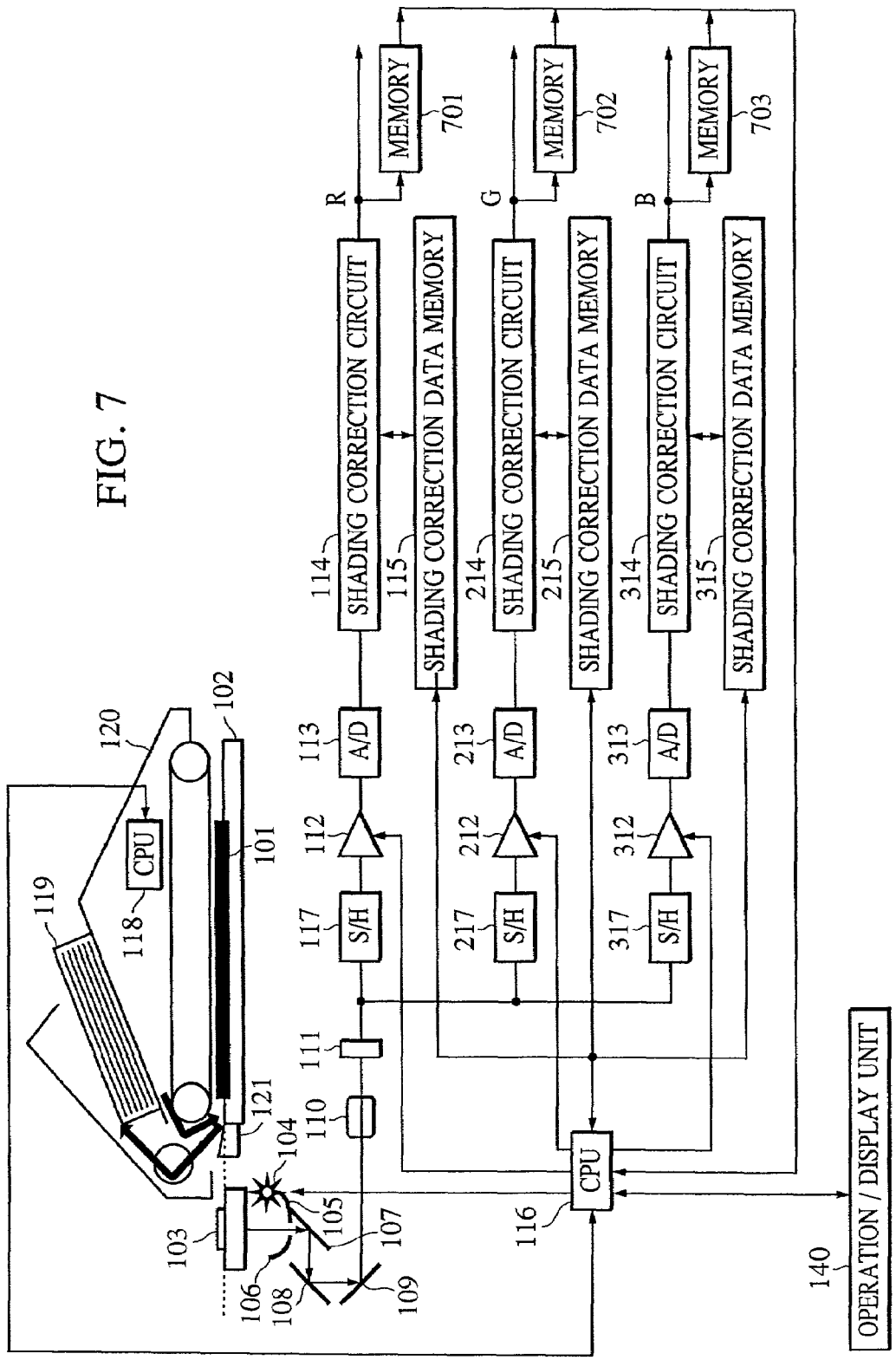
FIG. 7 is a block diagram of an image reading apparatus according to a second embodiment of the present invention.

FIG. 7 is a block diagram of an image reading apparatus according to a second embodiment of the present invention. In the second embodiment, the correction coefficients ECR, ECG, and ECB are determined and set in a different manner from in the first embodiment. In FIG. 7, the same reference numerals are given to the same function blocks as those in FIG. 1, and the description thereof is omitted. The image reading apparatus according to the second embodiment additionally includes memory units 701, 702, and 703, which are connected to the shading correction circuits 114, 115, and 116, respectively. The memory units 701, 702, and 703 store the R, G, and B signals after shading correction, respectively. The memory units 701, 702, and 703 are also connected to the CPU 116 to read the content stored by the CPU 116.

A determination and setting of the correction coefficients ECR, ECG, and ECB in the second embodiment are described.

Figure 8:
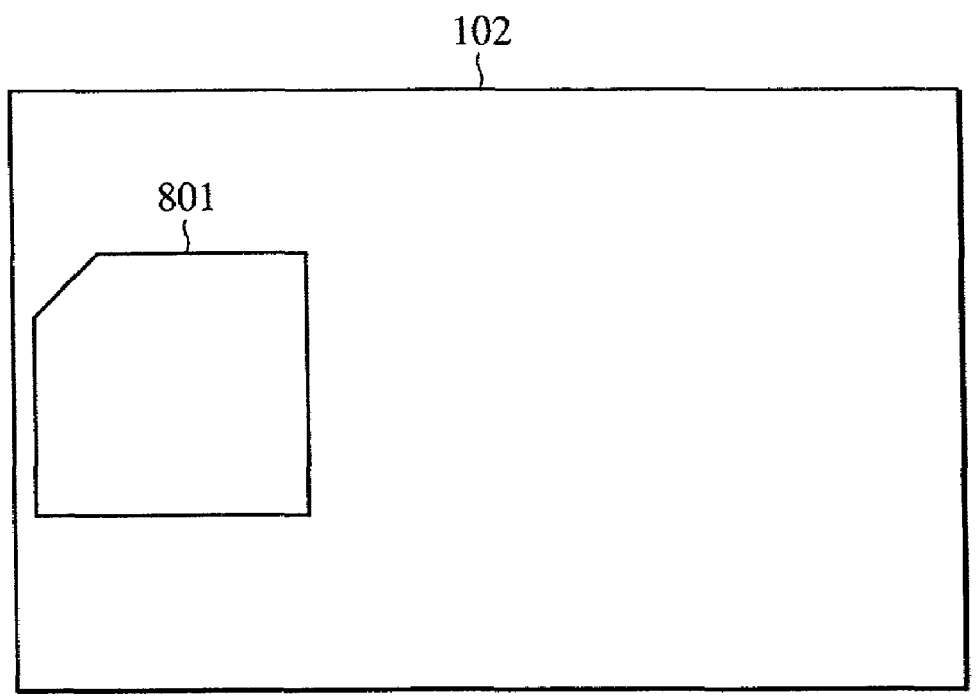
FIG. 8 is the layout of a calibration plate which is set in a specified position on a glass original table.

The glass original table 102 is implemented by an "uncoated glass plate" which is not coated with an EC coating agent and which has the same thickness as that of the glass plate 301 that carries the white plate 303. As shown in FIG. 8, a calibration plate 801 is set in a specified position on the glass original table 102. The calibration plate 801 may be made of a metal plate which is coated with an achromatic (for example, white) coating agent, and has a constant density. Each of the R, G, and B signals has a brightness (density) of approximately 220 levels with respect to a dynamic range of 0 to 255 of the output value after shading correction when the calibration plate 801 is read by the CCD 111.

Figure 9:
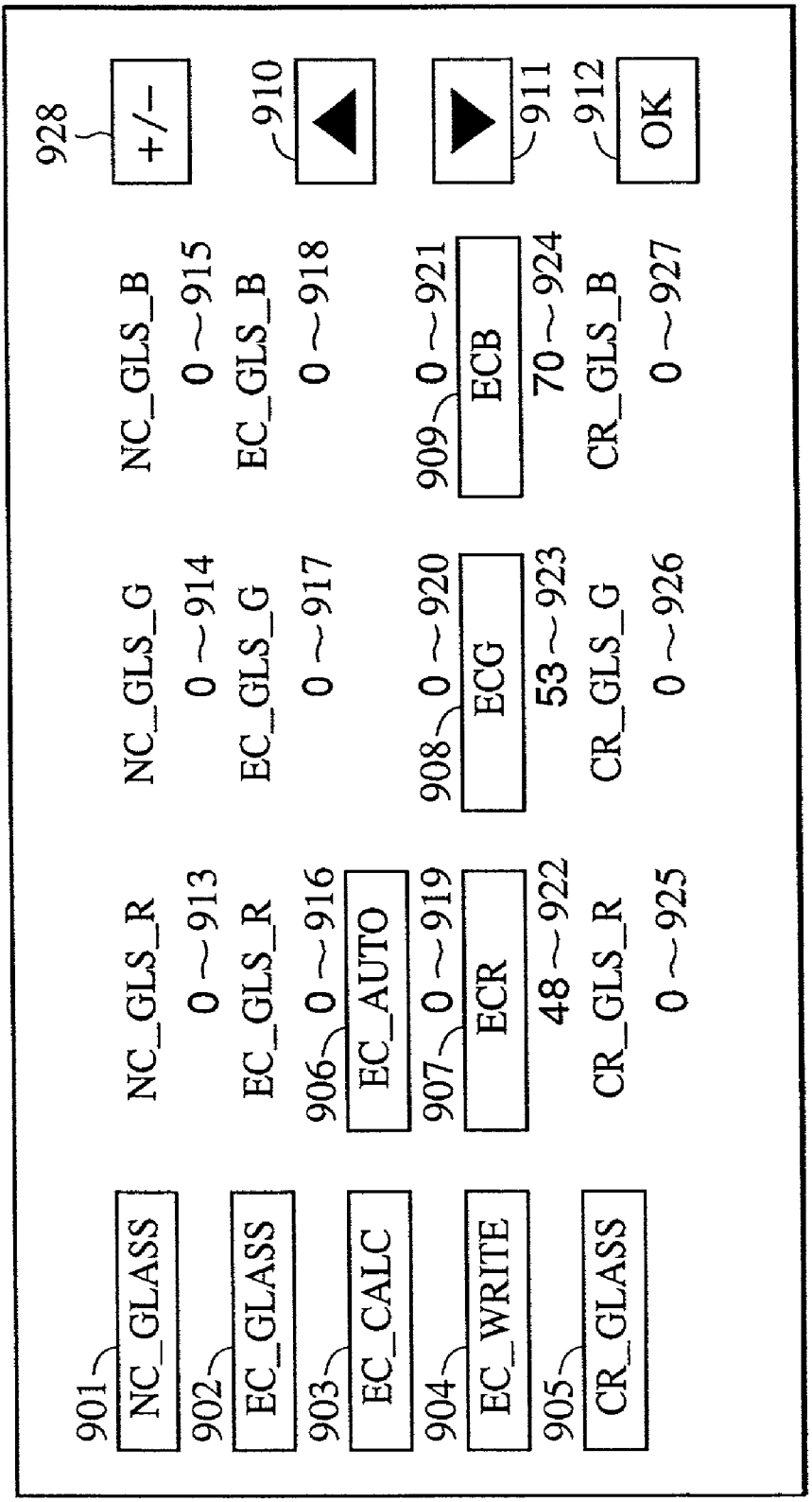
FIG. 9 is a view of an operating screen which is invoked by operating the operation/display unit.

Then, the operation/display unit 140 is operated to invoke an operating screen shown in FIG. 9. In the operating procedure, when an operator presses an "NC_GLASS" button 901, the CPU 116 allows the light source lamp 104 to flash, and drives the reflection mirrors 107 to 109 to read the reference white board 103 using the CCD 111. The shading correction coefficients are calculated from equation (2), and are then stored in the shading correction data memories 115, 215, and 315.

Once the calculated shading correction coefficients have been stored in the shading correction data memories 115, 215, and 315, the CPU 116 drives the reflection mirrors 107 to 109 to read the calibration plate 801 set in a predetermined position on the glass original table 102 using the CCD 111. The read data of the calibration plate 801 are input to the shading correction circuits 114, 214, and 314, and shading correction is performed according to equation (1) using the shading correction coefficients stored in the shading correction data memories 115, 215, and 315. The read signals after shading correction are stored in the memory units 701, 702, and 703. The CPU 116 reads the data stored in the memory units 701, 702, and 703 to determine mean values NC_GLS_R, NC_GLS_G, and NC_GLS_B of R, G, and B. The mean values NC_GLS_R, NC_GLS_G, and NC_GLS_B are stored in an internal memory of the CPU 116, and are further displayed on areas 913, 914, and 915 of the operating screen.

The glass original table 102 is implemented as an "EC-coated glass plate," and the calibration plate 801 is set in a designated position on the glass original table 102, as shown in FIG. 8. When an operator presses an "EC_GLASS" button 902 of the operation/display unit 140 shown in FIG. 9, the CPU 116 calculates shading correction coefficients in the same way as that of the above-noted "uncoated glass plate," and stores the resulting values in the shading correction data memories 115, 215, and 315.

Then, the CPU 116 allows the CCD 111 to read the data of the calibration plate 801, and performs shading correction before storing the read data in the memory units 701, 702, and 703. The shading-corrected data which are stored in the memory units 701, 702, and 703 are read to determine mean values EC_GLS_R, EC_GLS_G, and EC_GLS_B of the respective colors. The mean values EC_GLS_R, EC_GLS_G, and EC_GLS_B are stored in the internal memory of the CPU 116 and are displayed on areas 916, 917, and 918 on the operating screen.

When an operator presses an "EC_CALC" button 903, the CPU 116 performs a calculation as follows:

$$ECR = NC\_GLS\_R/EC\_GLS\_R$$

$$ECG = NC\_GLS\_G/EC\_GLS\_G \qquad (5)$$

$$ECB = NC\_GLS\_B/EC\_GLS\_B$$

The ECR, ECG, and ECB values calculated by equation (5) are displayed on areas 919, 920, and 921 of the operating screen. The calculated and displayed ECR, ECG, and ECB values are each indicative of the ratio of the read value of an original which is placed on the glass original table 102 when it is implemented as a normal glass plate which is not coated with an EC coating agent to the read value when it is implemented as an EC-coated glass plate (the three values, again, are for the three color components). This ratio corresponds to a ratio of the read values resulting from a difference in transmittancy between the normal glass plate and the EC-coated glass plate.

When an operator presses an "EC_WRITE" button 904, the CPU 116 stores the correction values ECR, ECG, and ECB displayed on the areas 919, 920, and 921 into a back-up memory of the CPU 116, and also displays them in areas 922, 923, and 924 on the operating screen.

When an operator presses a "CR_GLASS" button 905, the CPU 116 uses the shading correction coefficients αj calculated by equation (2) to calculate ECαj as follows:

$$EC\alpha Rj = \alpha Rj \times ECR$$

$$EC\alpha Gj = \alpha Gj \times ECG \quad (6)$$

$$EC\alpha Bj = \alpha Bj \times ECB$$

The resulting values ECαRj, ECαGj, and ECαBj are stored in the shading correction data memories 115, 215, and 315 as shading correction coefficients.

The CPU 116 drives the reflection mirrors 107 to 109 to read the calibration plate 801 region which is set in a predetermined position on the glass original table 102 using the CCD 111, and to perform shading correction on the read data, according to equation (1), using the shading correction coefficients stored in the shading correction data memories 115, 215, and 315. The read data after shading correction are stored in the memory units 701, 702, and 703, and the CPU 116 calculates mean values CR_GLS_R, CR_GLS_G, and CR_GLS_B of the data stored in the memory units 701, 702, and 703, and displays them in areas 925, 926, and 927 of the operating screen, respectively.

The calculated CR_GLS_R, CR_GLS_G, and CR_GLS_B values will correspond to NC_GLS_R, NC_GLS_G, and NC_GLS_B, respectively, if the shading correction coefficients are modified based on the ratio of the read values resulting from a difference in transmittancy between a normal glass plate, which is not coated with an EC coating agent, and an EC-coated glass plate, and if shading correction is performed using the modified shading correction coefficients. Therefore, when an EC-coated glass plate is used, the same read data as that when a normal glass plate which is not coated with an EC coating agent is used, can be attained.

When an operator presses an "EC_AUTO" button 906 instead of the "EC_GLASS" button 902, a sequence to turn on, sequentially, the "EC_GLASS" button 902, the "EC_CALC" button 903, the "EC_WRITE" button 904, and the "CR_GLASS" button 905 is automatically executed under control of the CPU 116. The "EC_AUTO" button 906 enables the determining operation to be facilitated in an efficient manner in a shorter time.

The image reading apparatus of the second embodiment also permits an operator to directly enter the ECR, ECG, and ECB values, which depend on the EC-coated glass plate used, on this display screen in the same way as in the first embodiment. When an operator turns on an "ECR" button 907, an area 922 is available to enter the ECR value. Under these conditions, an up or down switch 910 or 911 is pressed to increase or decrease the numeric value, and a plus/minus button 928 is pressed to select plus or minus. An "OK" button 912 is pressed, allowing the entered numeric value to be stored in a back-up memory of the CPU 116, and the data entry ends. Furthermore, an "ECG" button 908 and an "ECB" button 909 are turned on, and the ECG value and the ECB value are entered to areas 923 and 924 in the same way, respectively. The numeric values may be directly entered from a ten-key pad (not shown) instead of the up and down switches 910 and 911.

As described above, the image reading apparatus according to the second embodiment separately includes a white reference board and a glass original table. If the glass original table is implemented as an EC-coated glass plate having variations in transmittancy from product to product, the influence of the variations in transmittancy of glass plate can be eliminated, or at least reduced, during shading correction. Therefore, precise image reading can be achieved in which the resulting image is prevented from being foggy or obscure.

In the second embodiment, the ECR, ECG, and ECB values are stored in a back-up memory of the apparatus, ensuring for normal document reading operation that shading correction is performed using the shading correction coefficients given by equation (6). However, this is not critical, and, as described with respect to the first embodiment, a label containing the ECR, ECG, and ECB numeric data may be affixed to an EC-coated glass plate, which is referred to by an operator on the operating screen of the apparatus incorporating such an EC-coated glass plate to enter the ECR, ECG, and ECB numeric data to modify the shading correction coefficients.

In the second embodiment, the shading correction coefficients are modified based on the ratio of a read value when a normal glass plate which is not coated with an EC coating agent is used to a read value when an EC-coated glass plate is used, thereby eliminating the influence of variations in transmittancy of the EC-coated glass plate. However, other techniques such as a technique to correct for gain of document reading signals may also be used.

Third Embodiment

Figure 10:
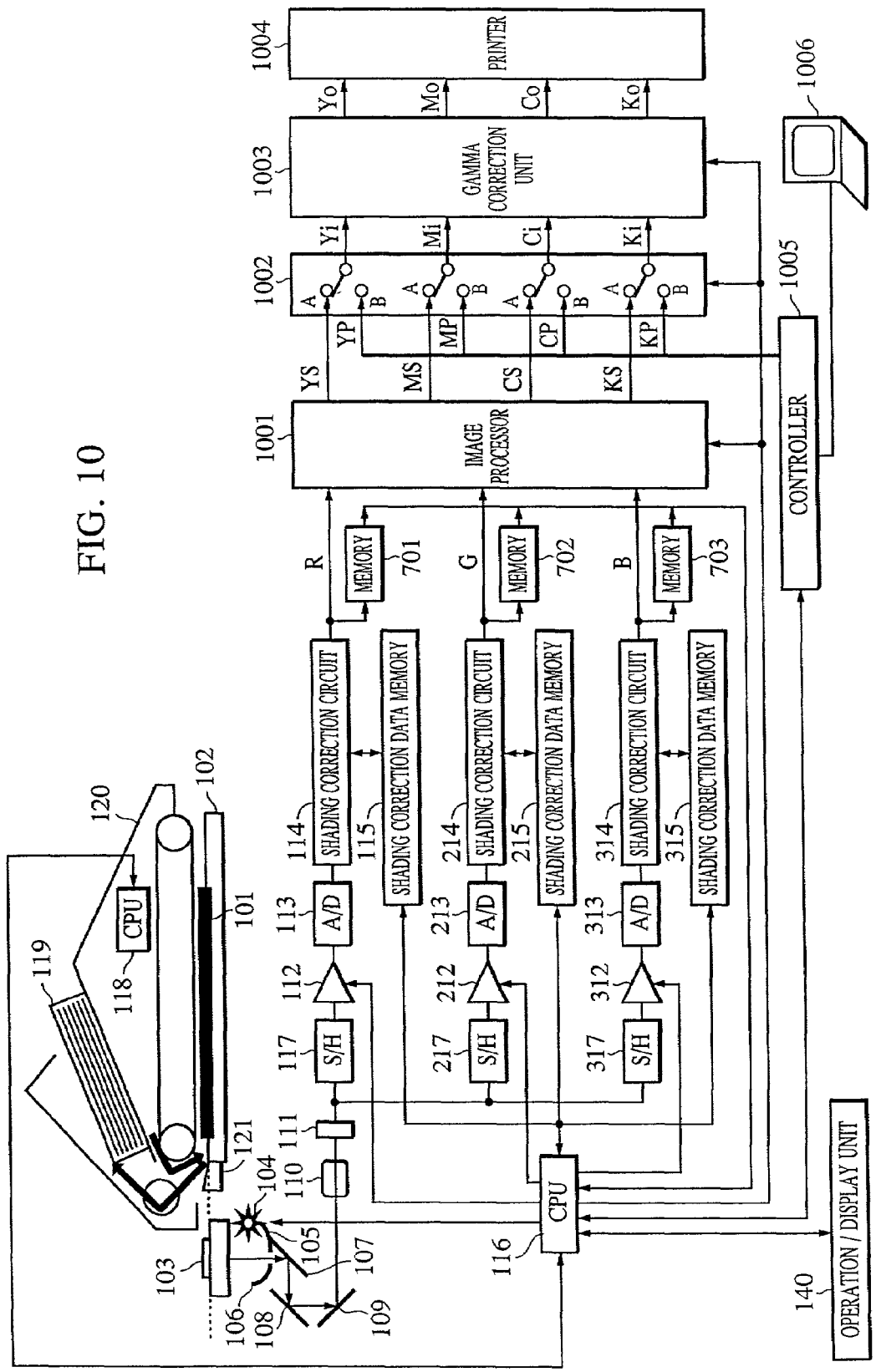
FIG. 10 is a block diagram of an image reading apparatus according to a third embodiment of the present invention.

FIG. 10 is a block diagram of an image reading apparatus according to a third embodiment of the present invention. The image reading apparatus according to the third embodiment is implemented as a multifunction apparatus having a copying function, a printing function, and the like, by way of example. The same reference numerals are given to the same function blocks as those shown in FIG. 1 or 7, and the description thereof is omitted.

In FIG. 10, an image processor 1001 receives R, G, and B signals after shading correction which are output from the shading correction circuits 114, 214, and 314. The received R, G, and B signals are converted into density signals YS, MS, CS, and KS indicative of yellow (Y), magenta (M), cyan (C), and black (K) by intensity-to-density conversion and masking, and are output. The image processor 1001 further includes a test signal generator which outputs test signals of the density signals YS, MS, CS, and KS under control of the CPU 116.

The output signals YS, MS, CS, and KS of the image processor 1001 are input to "A" terminals of a switch 1002. The signals YP, MP, CP, and KP, output from a controller 1005 as described below, are input to "B" terminals of the switch 1002. The switch 1002 is switched between the "A" terminals and the "B" terminals under control of the CPU 116. Output signals Yi, Mi, Ci, and Ki are output from the switch 1002, and are then input to a gamma correction unit 1003.

The gamma correction unit 1003 converts the input signals Yi, Mi, Ci, and Ki into signals Yo, Mo, Co, and Ko using table conversion whose conversion characteristic is controlled by the CPU 116. The output signals Yo, Mo, Co, and Ko of the gamma correction unit 1003 are input to a printer 1004 for printing on a print sheet using coloring agents of yellow, magenta, cyan, and black based on the input signals Yo, Mo, Co, and Ko.

The controller 1005 is connected to a personal computer 1006, and print file data which is input from the personal computer 1006 is printed out. The controller 1005 is also connected to the CPU 116 so as to provide a bi-directional command communication line therebetween.

The gamma correction operation of the image reading apparatus according to the third embodiment is now described.

Figure 11:
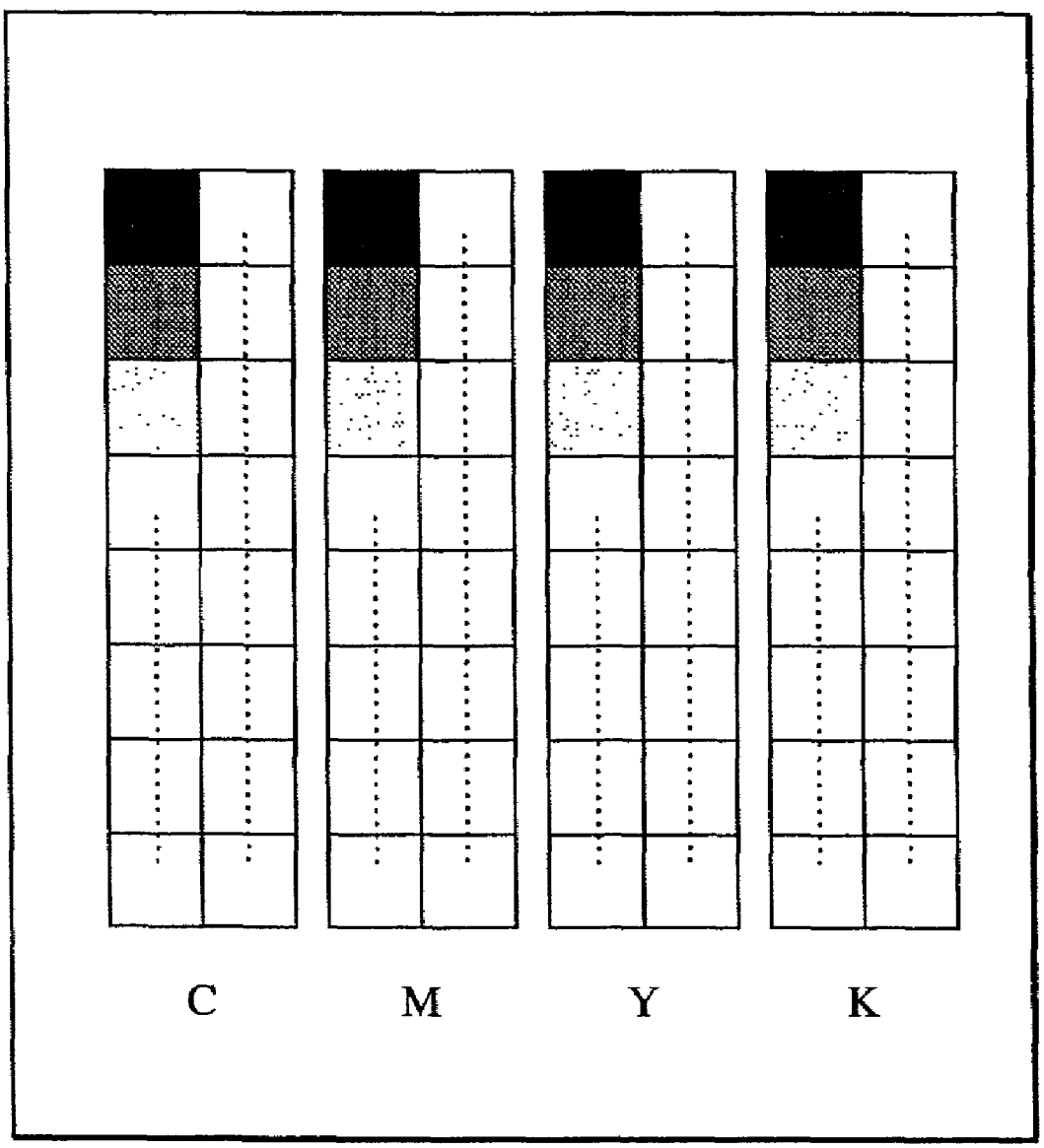
FIG. 11 is a view of test signals output from an image processor.

The CPU 116 allows the switch 1002 to switch to the "A" terminals, and controls the image processor 1001 to output test signals shown in FIG. 11 from the image processor 1001. The test signals shown in FIG. 11 are patch signals containing Y, M, C, and K signal values each varying in a range between the maximum density level and the minimum density level, and are controlled so that they are output at predetermined positions on a print sheet. The patch signals corresponding to all signal values ranging from the maximum density level to the minimum density level may be output. In this specification, however, 64 (64 grayscale levels) patch signals are output. The test signals output from the image processor 1001 are input to the gamma correction unit 1003 via the switch 1002.

Figure 12:
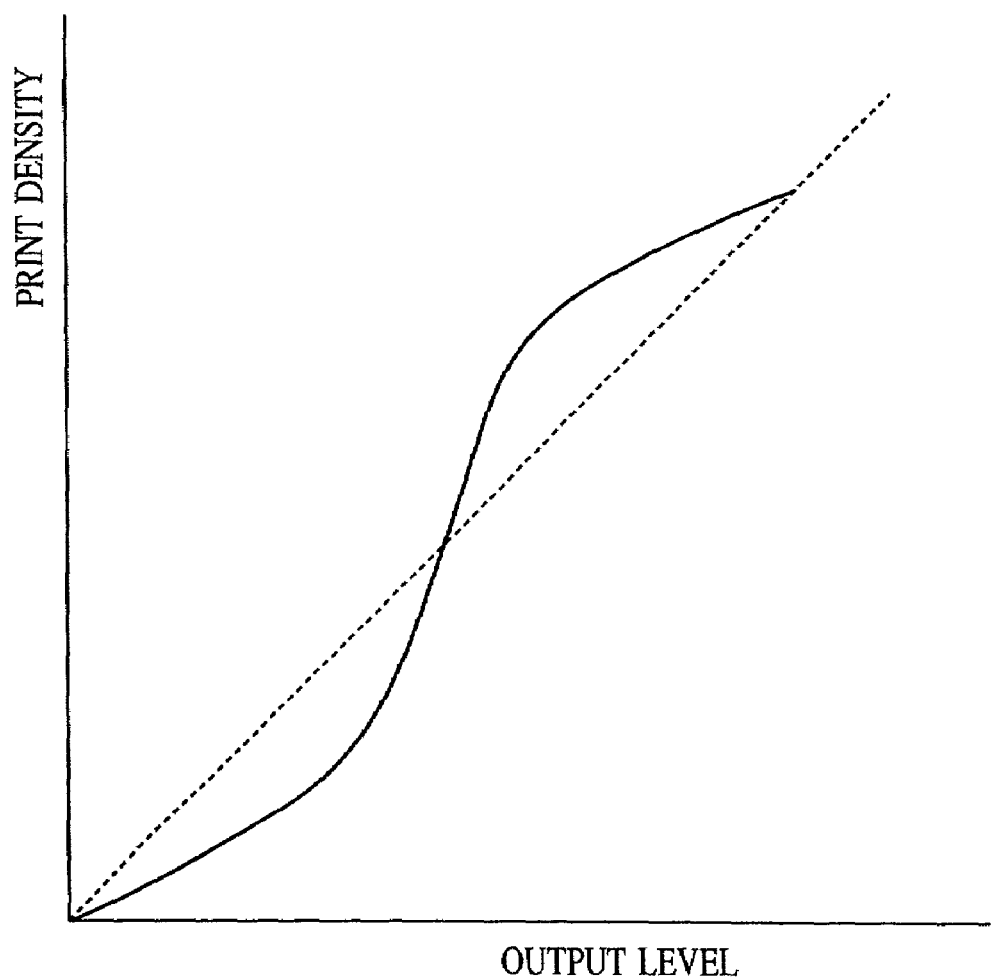
FIG. 12 is a graph showing a gradation characteristic of a printer which represents the colors cyan, magenta, yellow, and black.

The conversion table of the gamma correction unit 1003 when the test signals are output is set by the CPU 116 so that the input signals are output without being converted, and the input signals in the gamma correction unit 1003 are output to the printer 1004 without being changed. Then, the printer 1004 prints the test signals. The gradation characteristic of the thus printed test signal outputs is shown in FIG. 12. In the printer 1004, ideally, the gradation characteristic exhibits linearity with respect to the input signals, but actually exhibits nonlinearity due to variations in print characteristic of the printer 1004.

After placing a discharged print sheet on the glass original table 102, an operator operates the operation/display unit 140 to turn on a gradation correction switch. Once having detected that the gradation correction switch is turned on, the CPU 116 reads the white reference board 103 with the barcode to calculate shading correction data. In this operation, the transmittancy correction parameters ECR, ECG, and ECB of the glass original table, as previously described with reference to the first or second embodiment, are used to eliminate or reduce the influence of variations in transmittancy of the glass original table from product to product.

Upon determination and setting of the shading correction data, the CPU 116 starts reading the print sheet placed on the glass original table 102. The image signals read are subjected to shading correction by the shading correction circuits 114, 214, and 314 based on the shading correction data stored in the shading correction data memories 115, 215, and 315, and are then stored in the memories 701, 702, and 703, respectively. The CPU 116 reads the R, G, and B signals stored in the memories 701, 702, and 703 to detect the signal level of the C, M, Y, and K patches on the print sheet. The C patch, the M and K patches, and the Y patch refer to the R signal, the G signal, and the B signal, respectively.

Figure 13:
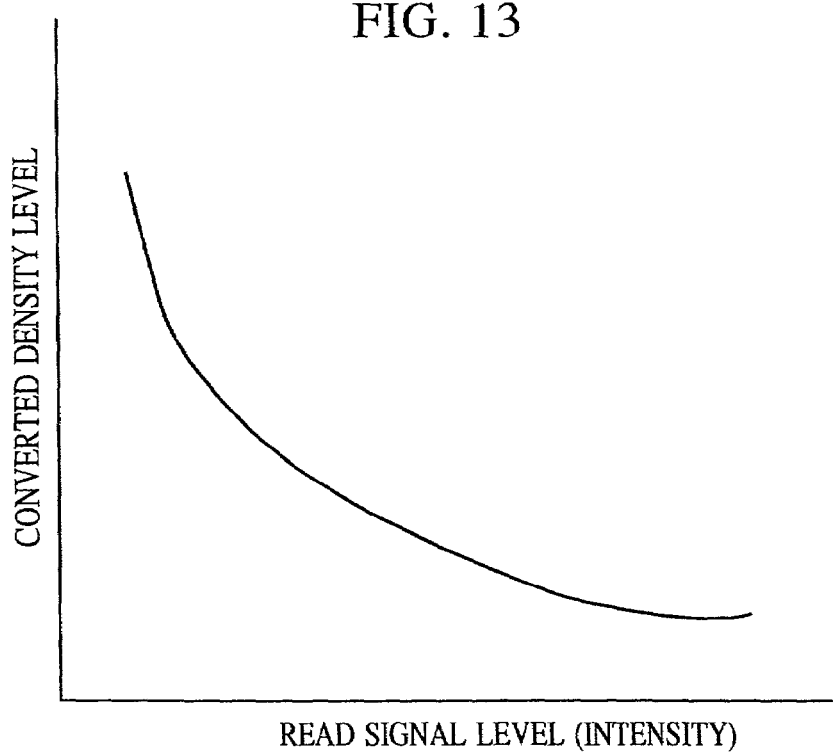
FIG. 13 shows an example of an intensity-to-density conversion table.
Figure 14:
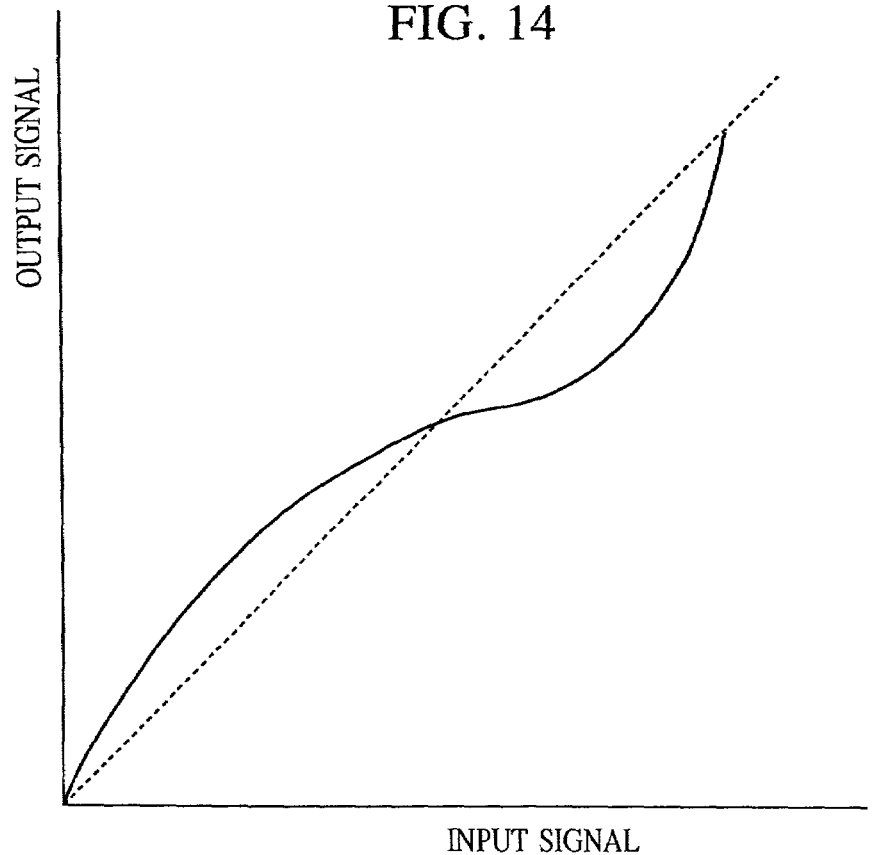
FIG. 14 shows an example of an intensity-to-density conversion table.
Figure 15:
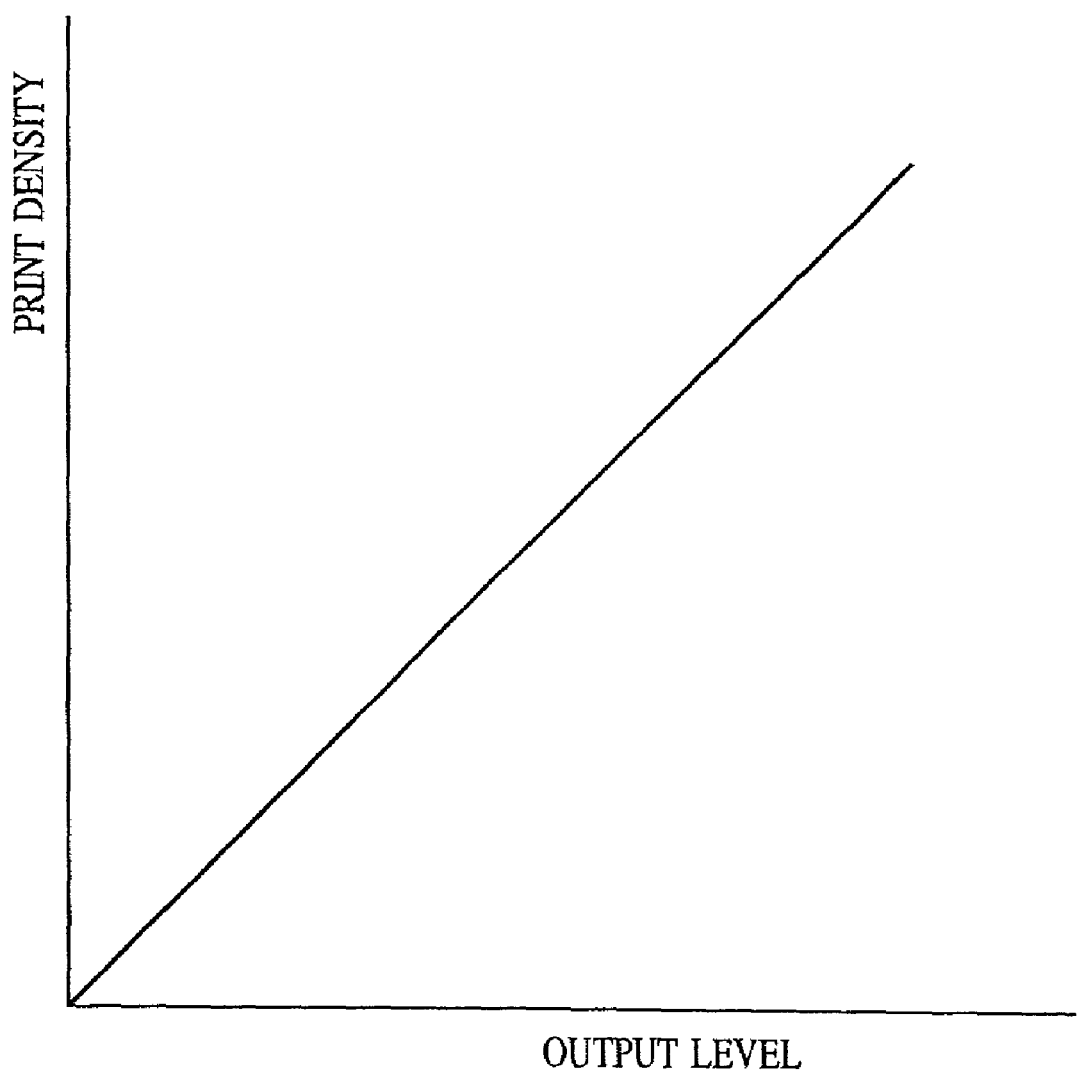
FIG. 15 shows an example of a conversion table.

The CPU 116 allows the image processor 1001 to intensity-to-density convert the signals based on a preset intensity-to-density conversion table to determine the density level of the patches. FIG. 13 shows an example intensity-to-density conversion table. This conversion table is prepared based on the C, M, Y, and K coloring agents used in the printer 1004 and the sensitivity characteristic of the line CCD 111 to R, G, and B. Through the aforementioned operation, the CPU 116 detects gradation characteristic (see FIG. 12) corresponding to the C, M, Y, and K colors of the printer 1004. The CPU 116 prepares a conversion table used to correct for the grayscale level of the patches output from the printer 1004 in order to obtain ideal gradation characteristic, and sets it as a conversion table for the gamma correction unit 1003. FIG. 14 shows one gamma conversion table, by way of example. This gamma conversion table is used to correct for the gradation characteristic of the printer 1004 shown in FIG. 12. The Yi, Mi, Ci, and Ki signals input to the gamma correction unit 1003 are converted into the Yo, Mo, Co, and Ko signals using the conversion table shown in FIG. 14, so that the gradation characteristic of C, M, Y, and K which are printed by the printer 1004 reveals an ideal characteristic, as shown in FIG. 15. Then, the gamma correction ends.

Copying Mode

The image reading apparatus according to the third embodiment which is switched to a copying mode to read and copy an original image on a print sheet is described.

One original document is placed on the glass original table 102, or a plurality of original documents are set on the DF 120. When the operation/display unit 140 is operated to turn on a switch to start copying, the CPU 116 calculates and sets the shading correction data as previously described, before starting reading the original document placed on the glass original table 102. The original reading signals after shading correction by the shading correction circuits 114, 214, and 314 are input to the image processor 1001.

The image processor 1001 converts the input R, G, and B signals into density signals YS, MS, CS, and KS, and outputs them to the switch 1002. The switch 1002 is switched to the "A" terminals by the CPU 116 to output density signals Yi, Mi, Ci, and Ki to the gamma correction unit 1003. The gamma correction unit 1003 converts the input density signals Yi, Mi, Ci, and Ki into density signals Yo, Mo, Co, and Ko using the conversion table prepared by gamma correction, and outputs the resulting signals to the printer 1004. The printer 1004 prints original image data on a print sheet based on the density signals Yo, Mo, Co, and Ko.

Printing Mode

The image reading apparatus according to the third embodiment which is switched to a printing mode and which serves as a printer to generate the print outputs from the personal computer 1006 is now described.

When a print file is input to the controller 1005 from the personal computer 1006, the controller 1005 instructs the CPU 116 to start printing. In response to the instruction to start printing, the CPU 116 switches the switch 1002 to the "B" terminals. Then, the controller 1005 converts the print file input from the personal computer 1006 into bitmap density signals Y, M, C, and K, and outputs the resulting signals to the "B" terminals of the switch 1002 as density signals YP, MP, CP, and KP.

When the density signals YP, MP, CP, and KP are input to the gamma correction unit 1003 via the switch 1002, the gamma correction unit 1003 performs gamma correction in a similar way to the copying mode. The gamma-corrected density signals are output to the printer 1004, where the image data of the print file is printed on a print sheet.

As described above, according to the image reading apparatus of the third embodiment, when an glass original table is implemented as an EC-coated glass plate, variations of the reading signal levels resulting from variations in transmittancy of EC-coated glass plates can be corrected for when printer gradation patches which are used as references to correct for the gradation characteristic of the printer are read. Thus, the printer gradation patches can be precisely read. In particular, when highlighted gradation patches are read, the read signals can be prevented from saturating, resulting in precise gradation correction. The gradation characteristic of the printer can be stable, and, advantageously, if the same file is output to a plurality of printers, a difference between the print outputs from different machines can be reduced, resulting in stable print outputs.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image reading apparatus comprising:
an original table which comprises a transparent member coated with a predetermined coating agent;
a reading unit which reads an original image through said coated transparent member of said original table and outputs an image signal;
a correction unit which corrects a signal level of the image signal in dependence on individual transmittancy of said coated transparent member;
a setting unit which sets individual data which depends on the individual transmittancy of said coated transparent member; and
a control unit which controls a correction operation of said correction unit in accordance with the individual data set by said setting unit.

2. An apparatus according to claim 1, wherein said predetermined coating agent includes an antistatic agent.

3. An apparatus according to claim 1, wherein said setting unit sets the individual data in accordance with a ratio between a first reading level, obtained by said reading unit reading a reference original through an uncoated transparent member, and a second reading level, obtained by said reading unit reading said reference original through said coated transparent member.

4. An apparatus according to claim 1, wherein the individual data is input on a screen.

5. An apparatus according to claim 1, wherein said correction unit corrects a shading of the image signal, and said control unit controls a shading correction operation in accordance with the individual data.

6. An apparatus according to claim 5, further comprising an uncoated transparent member wherein said reading unit reads a standard density member through the uncoated transparent member to make shading data.

7. An apparatus according to claim 1, wherein the image signal includes a plurality of color components, and said setting unit sets the individual data for each of the color components.

* * * * *